United States Patent

Baccman et al.

[11] Patent Number: 5,273,345
[45] Date of Patent: Dec. 28, 1993

[54] WHEEL WEIGHT CHANNEL CONCEAL BAND

[75] Inventors: Bjorn Baccman, Hendersonville; Gary Weirs, McKenzie, both of Tenn.

[73] Assignee: Del-Met Corporation, Hendersonville, Tenn.

[21] Appl. No.: 942,414

[22] Filed: Sep. 9, 1992

[51] Int. Cl.$^5$ .............................................. B60B 7/10
[52] U.S. Cl. ............................... 301/37.24; 301/37.34
[58] Field of Search ................. 301/37.1, 37.24, 37.31, 301/37.34

[56] References Cited

U.S. PATENT DOCUMENTS

| | | | |
|---|---|---|---|
| 2,279,332 | 4/1942 | Lyon | 301/37.24 |
| 2,455,151 | 11/1948 | Wood | 301/37.24 |
| 2,755,140 | 7/1956 | Lyon | 301/37.1 |
| 2,848,277 | 8/1958 | Lyon | 301/37.1 |
| 3,006,691 | 10/1961 | Lyon | 301/37.1 |
| 3,860,294 | 1/1975 | Jacobs | 301/37.1 |
| 3,860,296 | 1/1975 | Spisak | 301/37.24 X |
| 3,999,268 | 12/1976 | Jacobs | 301/37.1 |
| 4,094,550 | 6/1978 | Toal | 301/37.1 |
| 4,171,149 | 10/1979 | Marks | 301/37.42 |
| 4,438,979 | 3/1984 | Renz et al. | 301/37.1 X |
| 4,913,979 | 4/1991 | Buerger | 301/37.24 X |

Primary Examiner—Russell D. Stormer
Attorney, Agent, or Firm—Natter & Natter

[57] ABSTRACT

A conceal band for a painted or chromed stylized steel vehicle wheel overlies an annular concave peripheral channel of a wheel rim to conceal unsightly surfaces and wheel balance weights. The band, formed of sheet steel, is generally concave in transverse cross section facing the wheel and is of a radial width sufficient to overly and conceal the channel. The band carries a plurality of mounting clips retained between opposed inturned peripheral edges of the band. Each clip includes an arcuate body which spans radially across the band between the peripheral edges of the band. A cantilever leaf spring section projects beyond a radially outer end of the body with the leaf spring section being connected to the body by a sharp bend. The leaf spring section includes a curved engagement surface which is biased against the concave peripheral channel to retain the band. In an alternate embodiment, the leaf section projects from the radially inner end of the body and the engagement surface seats in notches formed in a wheel web adjacent the juncture of the wheel web and the wheel rim.

16 Claims, 2 Drawing Sheets

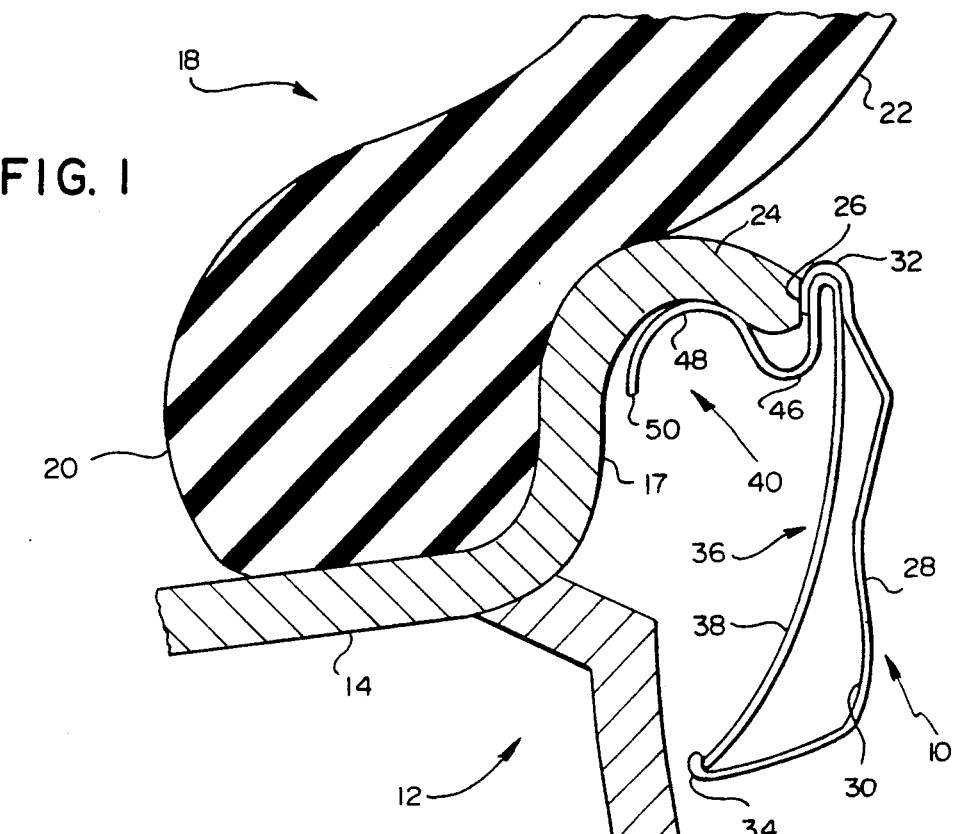
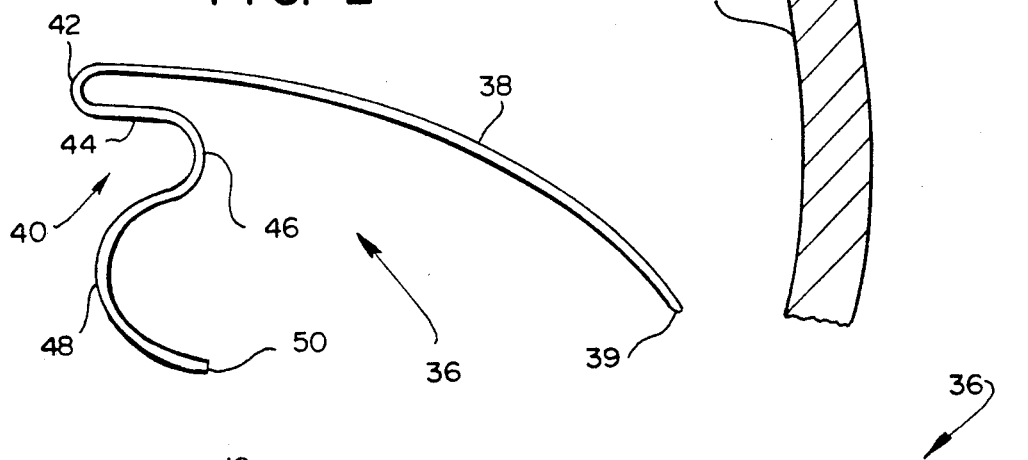
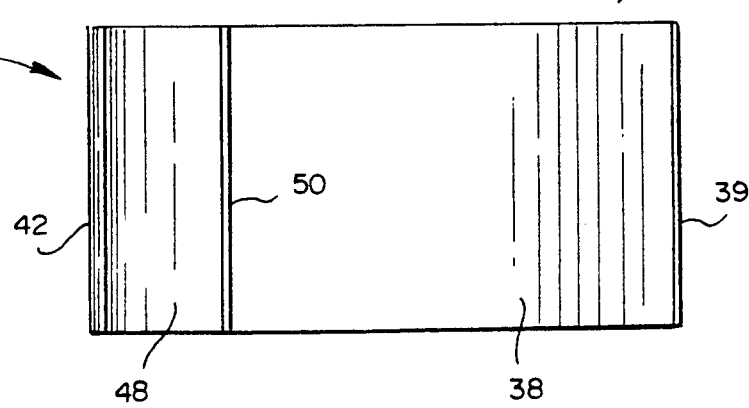

WHEEL WEIGHT CHANNEL CONCEAL BAND

1. Field of the Invention

This invention relates generally to a vehicle wheel trim and more specifically to a wheel weight channel conceal band.

2. Background History

There has been increased efforts at providing enhanced wheel appearance in not only automobile wheels but, in addition, wheels of sport utility vehicles and trucks. Such efforts have been pervasive in both original equipment and aftermarket industries.

While steel wheels have been the most economical approach at providing requisite wheel strength and utility, the appearance of stock steel wheels left much to be desired. In automotive applications, manufacturers constantly strove to meet fuel efficiency goals while at the same time sought to provide enhanced appearance at low cost. The original equipment manufacturing industry's approach toward meeting such objectives resulted in steel wheels to which light weight plastic wheel covers were mounted. The plastic wheel covers were generally injection molded and a variety of surface coatings were applied over the outer face of the plastic wheel cover.

In higher priced vehicles, automotive manufacturers utilized cast alloy wheels which did not require wheel covers. The cost of cast alloy wheels, however, has been significant; such wheels were generally not selected as an option by cost conscious consumers.

With respect to truck and other utility vehicle applications, steel wheels have been provided with a dress or styled appearance by surface coatings of either a chrome plating or paint. The enhanced aesthetic appearance of these wheels obviated the necessity of employing wheel covers. It was noted, however, that the concave wheel weight channel formed at the peripheral edge of the outer wheel rim flange as well as the outer edge of the rim flange itself, could not be adequately surface prepared to provide a smooth base for the coating. As a result, the finish at the wheel weight channel was noticeably inferior to that of the remainder of the wheel and thus detracted from the overall wheel appearance. Additionally, wheel balance weights, mounted within the channel, were unsightly and detracted from the symmetry of the wheel.

Although it had been suggested to provide a trim ring which overlied the wheel weight channel, a prior attempt at furnishing such trim ring suffered the disadvantage of requiring an elaborate mounting system to retain the trim ring to the wheel. The mounting system not only added significantly to the vehicle weight, but included sharp teeth which were employed to engage the wheel and whose use resulted in scraping the protective wheel coating of chrome or paint, thus resulting in unsightly rust. Additionally, the mounting system included a U shaped wheel engagement clip, one leg of which overlied the outer edge of the wheel rim flange and abutted the vehicle tire itself, resulting in a source of potential tire damage.

SUMMARY OF THE INVENTION

In compendium, the invention comprises a conceal band formed of sheet steel and adapted to overlie a wheel weight channel of a vehicle wheel. The band is configured with a concave transverse cross section bordered by concentric peripheral edges, each of which is inturned toward the concave portion of the band.

A plurality of one piece spring steel mounting clips secure the band to the wheel with each clip having arcuate body spanning radially across the concave surface of the band and seated between the inturned peripheral edges of the band. A cantilever leaf section projects axially inwardly, toward the wheel weight channel, from the radially outer end of the clip body. The cantilever section is connected to the clip body by a sharp bend which clears the inturned peripheral edge.

A curved engagement surface, provided in the cantilever leaf section, is biased against the concave wheel weight channel to mount the conceal band to the wheel.

In alternate embodiment, the cantilever leaf section projects beyond the radially inner end of each clip body and the curved engagement surface of the cantilever leaf section is biased against and seats within cut out notches formed in a wheel web adjacent the wheel rim.

From the foregoing the compendium, it will be appreciated that it is an aspect of the present invention to provide a wheel weight channel conceal band of the general character described which is not subject to the disadvantages of the background history aforementioned.

It is feature of the present invention to provide a wheel weight channel conceal band of the general character described which is low in cost and suitable for economical mass production fabrication.

A consideration of the present invention is to provide a wheel weight channel conceal band of the general character described which is light in weight thereby fostering achievement of vehicle fuel efficiency goals.

A further feature of the present invention is to provide a wheel weight channel conceal band of the general character described which utilizes a plurality of smooth surface mounting clips to securely fasten the band to a vehicle wheel without switching the wheel.

Another aspect of the present invention is to provide a wheel weight channel conceal band of the general character described which utilizes a plurality of mounting clips configured to simplify mounting of the band to a wheel.

To provide a wheel weight channel conceal band of the general character described which may be coated with a finish matching that of the wheel is yet another aspect of the present invention.

A further feature of the present invention is to provide a wheel weight conceal band of the general character described which inconspicuously conceals an otherwise unsightly wheel weight channel formed at the peripheral edge of a wheel rim flange.

A still further aspect of the present invention is to provide a wheel weight channel conceal band of the general character described which may be mounted to a vehicle wheel without interfering with the placement of previously positioned wheel weights.

Other aspects, features and considerations of the present invention in part will be obvious and in part will be pointed out hereinafter.

With these ends in view, the invention finds embodiment in various combinations of elements, arrangements of parts and series of steps by which the said aspects, features and considerations are attained all with reference to the accompanying drawings and the scope of which will be more particularly pointed out and indicated in the appended claims.

BRIEF DESCRIPTION OF THE DRAWINGS

In the accompanying drawings in which are shown some of the various possible exemplary embodiments of the invention, FIG. 1 is an enlarged scale fragmentary sectional view through a vehicle wheel having a wheel weight channel conceal band constructed in accordance with and embodying the invention, with portions deleted for clarity, and showing a mounting clip carried by the conceal band with the clip having a cantilever leaf section which engages the wheel weight channel to secure the band to the wheel;

FIG. 2 is an enlarged scale side elevational view of the mounting clip, shown in an unstressed state;

FIG. 3 is a bottom plan view of the mounting clip illustrated in FIG. 2;

DESCRIPTION OF THE PREFERRED EMBODIMENTS

Figure 4:
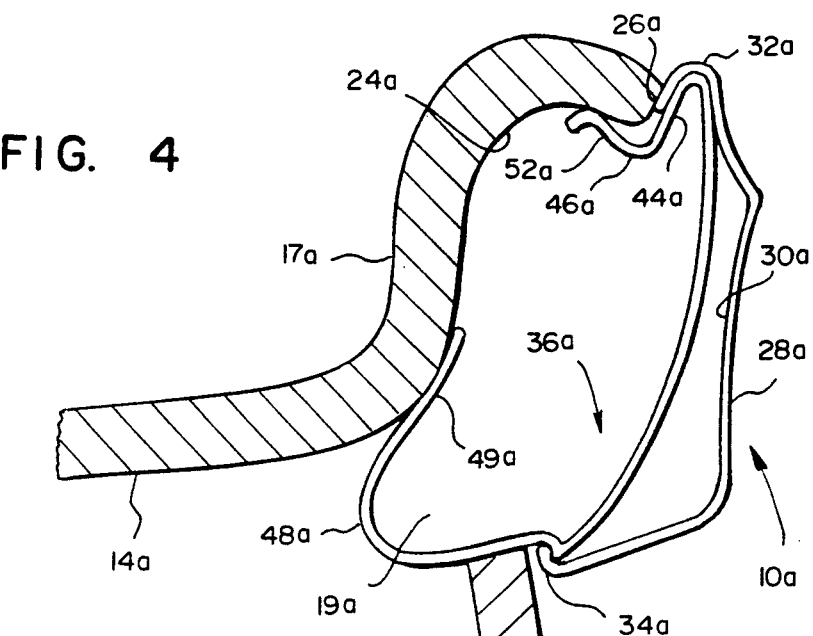
FIG. 4 is a sectional view through a vehicle wheel and a wheel weight channel conceal band constructed in accordance with an alternate embodiment of the invention, with portions deleted for clarity, wherein a cantilever leaf section of a mounting clip projects into and engages a cut out notch formed in a wheel hub.

Referring now in detail to the drawings, the reference numeral 10 denotes generally a wheel weight channel conceal band constructed in accordance with and embodying the invention. As will be noted from an observation of FIG. 1, the conceal band 10 is mounted to a wheel, denoted generally by the reference numeral 12. The wheel is of steel construction and includes a wheel rim 14 and a hub or web 16. The rim 14 is configured to include, adjacent each of its axial ends, a rim flange 17.

A vehicle tire 18, including an annular tire bead 20 and a side wall 22, is mounted to the wheel 12 by engagement between the tire bead 20 and the rim flange 17. The rim flange 17 includes an annular concave wheel weight channel 24 which terminates at a peripheral edge 26.

The wheel 12 is preferably formed of welded, rather than cast construction and with its outer wheel face being of stylized configuration so as to obviate the necessity for utilizing wheel covers. Wheels of this type have become increasingly popular for employment on sport utility vehicles and utility vehicles. The wheel 12 itself may be fabricated of stainless steel which is polished or may be fabricated of steel over which a coating such as chrome plating or paint is applied. Although the visible outer face of the wheel 12 is stylized, the concave wheel weight channel 24 is designed and configured by purely functional considerations. The configuration of the channel 24 is such as to carry conventional wheel weights and, in addition, to provide a relatively smooth lip on its radially outward surface to facilitate the mounting of the tire 18.

As heretofore discussed, the appearance of the wheel weight channel detracts significantly from the overall appearance of the wheel itself and it has been suggested to cover the wheel weight channel and any wheel weights carried thereon with trim.

Because it is desireable to leave the remainder of the outer face of styled wheel 12 exposed, the radial span of the wheel weight conceal band 10 is not significantly greater than the radial span of the wheel weight channel 24 and the adjacent portion of the rim flange 17. The conceal band 10 may partially cover an adjacent annular portion of the wheel hub 16 as shown in FIG. 1.

The conceal band 10 is preferably formed of sheet metal such as steel and includes an outer axial face 28 which is coated with a finish matching that of the wheel 12 and an inner axial face 30. Alternatively, the sheet metal may comprise stainless steel and the outer axial face may be finished by buffing and polishing. The conceal band 10 also includes a radially outer peripheral edge 32 which is inturned or curled toward the inner axial face 30 and a radially inner peripheral edge 34 which is also inturned or curled toward the face 30.

In order to securely mount the band 10 to the wheel 12 without significantly increasing the total weight of the conceal band 10, a plurality of clips 36 are employed. Preferably, between four and six clips are symmetrically positioned about the conceal band 10 with the band orientation and/or the exact clip locations avoiding contact with any wheel weights carried within the wheel weight channel 24.

Each clip 36 is formed of spring steel and is of generally rectangular plan configuration as illustrated in FIG. 3. The clip 36 includes a generally arcuate body 38 which extends between the inner peripheral inturned edge 34 and the outer peripheral inturned edge 32. To position a clip 36 between the inturned edges 32, 34, the clip is concavely flexed beyond its unstressed state illustrated in FIG. 2. The body 38 is then allowed to flex outwardly, expanding the distance between its ends, thereby securely retaining the body between the inturned edges 32, 34.

When carried between the inturned edges of the band, one free end 39 of the body is in abutment against the internal surface of the inturned edge 34 and a sharp U bend 42, at the other end of the body 38, is in abutment against the internal surface of the inturned edge 32.

Pursuant to the invention, a cantilever leaf section 40 projects axially inwardly from the body 38 from the U bend 42 through which it is connected, in one piece construction, to the body 38.

Referring now in detail to FIG. 2 wherein the clip 36 is shown in its unstressed state, that is not carried between the inturned edges of a conceal band, it will be seen that the radius of the sharp U bend 42 is of a smaller diameter than that of the internal surface of the inturned edge 32 of the conceal band 10 and that the cantilever leaf section 40 extends from the U bend 42 with a proximal leg 44 substantially parallel to the body 38 and of a length sufficient to clear the peripheral edge 26 of the flange 17 and an adjacent portion of the wheel weight channel 24.

From the proximal leg 44, the cantilever leaf section 40 projects axially inwardly (toward the face of the wheel 12) with a reverse bend 46, of a radius greater than that of the sharp U bend 42 and from the reverse bend 46, to a smooth curved engagement surface having a radius greater than that of the reverse U bend. The cantilever leaf extension terminates at a distal free edge 50.

The operation of the clip 36 in securely engaging the conceal band 10 will now be appreciated, with reference again to FIG. 1 where it will be observed that the diameter of the engagement surface 48 is less that of the arcuate surface of the wheel weight channel 24. As a result, when the cantilever leaf section 40 is moved radially inwardly, as a result of the conceal band 10 being mounted to the wheel weight channel, the radially outward spring force exerted by the cantilever leaf section, at the engagement surface 48, tends to not only maintain the conceal band 10 mounted to the wheel weight channel 24 but, in addition, due to the camming engagement between the curved engagement surface 48 and the curved wheel weight channel 24, exhibits an axial force component, tending to urge the outer peripheral inturned edge 32 in abutment against the peripheral edge 26 of the wheel flange 17.

Figure 5:
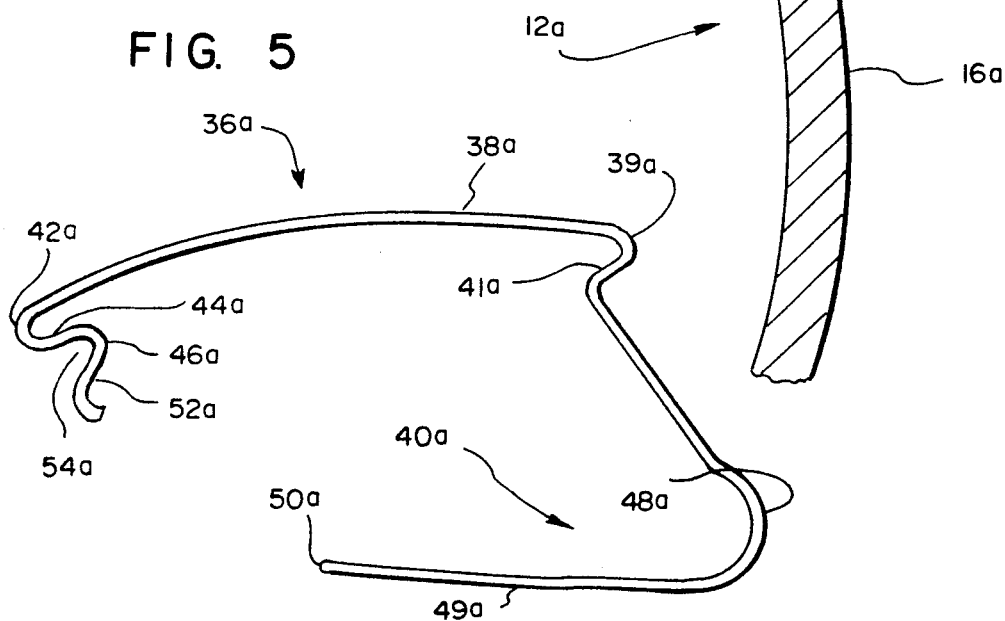
FIG. 5 is an enlarged side elevational view of the mounting clip of the embodiment of FIG. 4, shown in an unstressed state.
Figure 6:
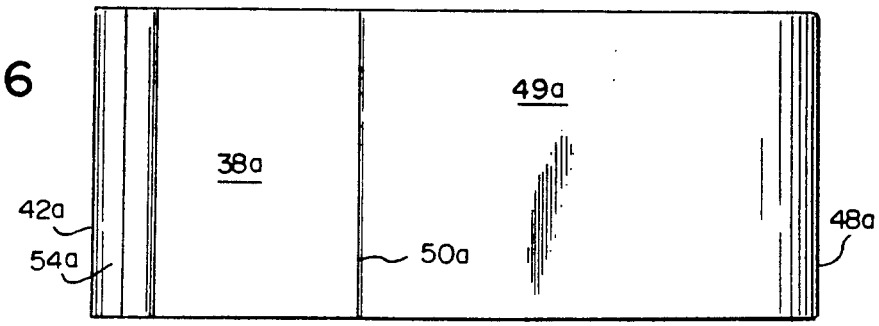
FIG. 6 is a bottom plan view of the mounting clip illustrated in FIG. 5.

An alternate embodiment of the invention is depicted in FIGS. 4 through FIG. 6 wherein like numerals have been employed to designate like components of the previous embodiment, however, bearing the suffix "a". In the alternate embodiment of the invention, a modified clip configuration is employed to provide supplemental conceal band retention, in addition to that provided by the clips of the prior embodiment or, as an exclusive mechanism for retaining a conceal band.

The modified clip employs a cantilever leaf section which projects from a body of the clip at the inner, rather than the outer, inturned peripheral edge of the conceal band and engages a cut out notch formed in a wheel hub.

Referring now in detail to FIG. 4 through FIG. 6, it will be seen that a conceal band 10a is provided for concealing a concave wheel weight channel 24a of a wheel 12a. The wheel 12a is substantially similar to the wheel 12 of the embodiment previously described, and includes a rim 14a, a rim flange 17a, a wheel weight channel 24a and with the flange 17a terminating at a peripheral edge 26a.

A wheel hub 16a differs, however, from the wheel hub 16 of the prior wheel 12 and includes a plurality of symmetrically spaced cut out notches 19a positioned adjacent the juncture of the wheel hub 16a and the rim 14a.

The conceal band 10a is substantially identical the conceal band of the prior invention and includes an outer axial face 28a which is finished to match or be compatible with the finish of the wheel 12a and an inner axial face 30a. The conceal band 10a also includes an outer peripheral edge 32a which is inturned or curled and an inner peripheral edge 34a, also inturned. A plurality of mounting clips 36a is provided with each clip including a clip body 38a carried between the inturned peripheral edges, 32a, 34a.

The clip body 38a includes a sharp U bend 39a which is seated within the radially inner inturned peripheral edge 34a of the band 10a and, at its opposite end, a further sharp bend 42a which is seated within the radially outer inturned peripheral edge 32a of the band 10a.

From the inner band end 39a, the clip 36a extends axially and radially inwardly, toward the face of the wheel, along a proximal leg 43a which terminates at a curved engagement surface 48a. From the curved engagement surface 48a, the clip extends radially outwardly along a distal leg 49a to a free end 50a. The distal leg 49a, curved engagement surface 48a, and proximal leg 43a comprise a cantilever leaf section 40a.

At the opposite (radially outer) end of the clip body 38a, the clip extends from the sharp U bend 42a through a relatively short proximal leg 44a to a curved bend 46a and a distal leg 52a. The proximal leg 44a, curved bend 46a and the distal leg 52a form a radially outwardly facing retention channel 54a which is configured to engage the peripheral edge 26a of the flange 16a and the surface of the wheel weight channel 24a adjacent to the peripheral edge.

The conceal band 10a is mounted to the wheel by engagement of the curved engagement surface 48a of the cantilever leaf extension which seats into the cut out notch 19a with the retention channel 52a serving to balance radially outward reaction forces generated by the deflection of the cantilever leaf section and prevent distortion of the conceal band 10a.

It should be appreciated that three or more mounting clips 36a may be employed, with the number employed coinciding with the number of cut out notches in the wheel web 16a. Additionally, a number of mounting clips 10 of the prior embodiment may be used as a supplemental mounting mechanism in conjunction with the band 10a.

The employment of either the mounting clips 10 of the first embodiment and/or the mounting clips 10a of the second embodiment provides versatility, permitting the same conceal band to be used with wheels from a variety of sources regardless of tolerance variations in the outer diameter of the wheel weight channels.

In a typical application, the wheel mount clips constructed in accordance with the invention are fabricated of 1050 spring steel of a thickness of approximately 0.02 inches. The width of a typical mounting clip, for example, a clip employed for a trim ring mounted to a 15 inch wheel, is in the order of 0.50 inches. It should be appreciated that the clips securely retain the conceal band by spring force exerted by the smooth engagement surface of the cantilever leaf section acting against the corresponding wheel surface. The clips do not employ sharp teeth or other surfaces which could scratch or mar the wheel finish.

Thus it will be seen that there is provided a wheel weight channel conceal band which achieves the various aspects, features and considerations of the present invention and which is well adapted to meet the conditions of practical usage.

Having thus described the invention there is claimed as new and desired to be secured by Letters Patent:

1. An annular band for concealing a concave annular peripheral wheel rim channel of a vehicle wheel, the band having an outer axial face and an inner axial face, a radially outer peripheral edge and a concentric radially inner peripheral edge, the radial width of the band being at least as great as the radial width of the annular peripheral wheel rim channel, the band being configured with an axially inwardly curved channel at each peripheral edge, the band peripheral edge channels facing one another, the band further including a plurality of mounting clips, each clip being formed of sheet spring material of substantially uniform thickness and width and including a body, the body having a pair of opposite longitudinal ends, each longitudinal end being seated in one of the band peripheral edge channels, means for securing each clip to the band, each clip further including an axially inwardly extending cantilever leaf spring section, the cantilever leaf spring section including a curved engagement portion for non-scratch spring biased contact with the vehicle wheel to secure the conceal band to the wheel in a position covering the annular peripheral wheel rim channel, the cantilever leaf spring section extending from one of the longitudinal ends of the body, the cantilever leaf spring section being connected to the one longitudinal end by an integral bend in the sheet spring material of which the clip is formed, the bend being dimensioned to be received within the band peripheral edge channel within which the one longitudinal end is seated.

2. An annular band as constructed in accordance with claim 1 for concealing a concave annular peripheral wheel rim channel wherein the clip body is formed with an unstressed length which is greater than the distance between the band peripheral edge channels, the body being stressed to reduce its length for seating the longitudinal ends of the body in the band peripheral edge channels, the longitudinal ends of the body exerting radial force against the band peripheral edge channels to secure each clip to the band, the stressed configuration of the body comprising the means for securing each clip to the band.

3. An annular band as constructed in accordance with claim 1 for concealing a concave annular peripheral wheel rim channel wherein the cantilever leaf spring section of each clip is integral with the body of each clip, each clip being formed of one piece construction.

4. An annular band for concealing a concave annular peripheral wheel rim channel as constructed in accordance with claim 1 wherein the curved engagement portion of the cantilever leaf spring section is configured for non-scratch engagement with a concave portion of the annular peripheral wheel rim channel.

5. An annular band as constructed in accordance with claim 1 for concealing a concave annular peripheral wheel rim channel wherein the band is formed of sheet metal, the band peripheral edge channels being formed by inturning the peripheral edges of the band.

6. An annular band as constructed in accordance with claim 5 for concealing a concave annular peripheral wheel rim channel wherein the sheet metal comprises stainless steel, the outer axial face of the band being polished.

7. An annular band as constructed in accordance with claim 5 for concealing a concave annular peripheral wheel rim channel wherein the outer axial face of the band is coated with a finish compatible with the finish of the vehicle wheel.

8. A unitary one piece clip for mounting an annular band to conceal a concave annular peripheral wheel rim channel of a vehicle wheel, the annular band having a pair of opposed inturned peripheral edges, the clip being formed of sheet spring material having substantially uniform thickness and width, the clip comprising a body portion having an unstressed length at least as great as the radial distance between the inturned peripheral edges of the band, the clip further including a cantilever leaf spring section extending from one end of the body in a direction transverse to the length of the body, the cantilever leaf spring section being connected to the one end by a bend in the sheet spring material, the bend being dimensioned to permit the seating of the one body end in one of the inturned peripheral edges of the band, the cantilever leaf spring section being configured with a smooth surface for non-scratch spring biased engagement against the wheel to retain the conceal band to the wheel.

9. A unitary one piece clip as constructed in accordance with claim 8 for mounting an annular conceal band wherein the annular peripheral wheel rim channel includes a peripheral edge, the engagement surface of the cantilever leaf section being connected to the bend by a reverse curve, the reverse curve being configured to clear the peripheral wheel rim channel edge, the engagement surface being configured to engage the concave wheel rim channel.

10. A unitary one piece clip as constructed in accordance with claim 8 for mounting an annular conceal band wherein the clip is formed of spring steel, the body being configured with an arcuate curve, the unstressed length of the body being greater than the distance between the inturned peripheral edges of the band.

11. A unitary one piece clip as constructed in accordance with claim 8 for mounting an annular conceal band wherein the wheel includes a hub, the hub being joined to the wheel rim, the hub including a plurality of symmetrically spaced cut out notches, the curved engagement surface of the cantilever leaf spring section being configured for seating within a selected cut out notch of the hub.

12. A unitary one piece clip as constructed in accordance with claim 11 for mounting an annular conceal band the clip further including a bend at the other end of the body, means connected to the bend at the other end of the body for engaging the peripheral wheel rim channel.

13. An annular band for concealing a concave annular peripheral wheel rim channel of a vehicle wheel, the band having an outer axial face and an inner axial face, a radially outer peripheral edge and a concentric radially inner peripheral edge, the radial width of the band being at least as great as the radial width of the annular peripheral wheel rim channel, the band being configured with an axially inwardly curved channel at each peripheral edge, the band peripheral edge channels facing one another, the band further including a plurality of mounting clips, each clip being formed of sheet spring material of substantially uniform thickness and width and including a body, the body having a pair of opposite longitudinal ends, each longitudinal end being seated in one of the band peripheral edge channels, means for securing each clip to the band, each clip further including an axially inwardly extending cantilever leaf spring section, the cantilever leaf spring section being connected to the body at the longitudinal end seated in the radially outer peripheral edge channel of the band, the cantilever leaf spring section including a curved engagement portion for non-scratch spring biased contact with the vehicle wheel to secure the conceal band to the wheel in a position covering the annular peripheral wheel rim channel.

14. An annular band as constructed in accordance with claim 13 for concealing a concave annular peripheral wheel rim channel wherein the vehicle wheel further includes a wheel hub joined to the wheel rim and a plurality of symmetrically positioned cut out notches in the wheel hub adjacent the wheel rim, the band further including an additional plurality of mounting clips, each of the mounting clips of the additional plurality being formed of sheet spring material of substantially uniform thickness and width and including a body, the body having a pair of opposite longitudinal ends, each end being seated in one of the band peripheral edge channels and means for securing each clip of the additional plurality to the band, each clip of the additional plurality further including an axially inwardly extending cantilever leaf spring section connected to the body at the longitudinal end of the body seated in the radially inner peripheral edge channel of the band, the cantilever leaf spring section including a curved engagement portion configured for non-scratch spring biased engagement with one of the cut out notches to mount the conceal band to the wheel in a position covering the annular wheel rim channel.

15. An annular band for a vehicle wheel, the wheel having a wheel hub and a wheel rim, the hub being joined to the rim, the rim having a peripheral wheel rim channel, the wheel hub having a plurality of cut out notches adjacent the wheel rim, the band having an outer axial face and an inner axial face, a radially outer peripheral edge and a concentric radially inner peripheral edge, the radial width of the band being at least as great as the radial width of the annular peripheral wheel rim channel, the band being configured with an axially inwardly curved channel at each peripheral edge, the band peripheral edge channels facing one another, the band further including a plurality of mounting clips, each clip being formed of sheet spring material of substantially uniform thickness and width and including a body, the body having a pair of opposite longitudinal ends, each longitudinal end being seated in one of the band peripheral edge channels, means for securing each clip to the band, each clip further including an axially inwardly extending cantilever leaf spring section, the cantilever leaf spring section being connected to the body at the longitudinal end seated in the radially inner peripheral edge channel of the band, the cantilever leaf spring section including a curved engagement portion for non-scratch spring biased contact with one of the cut out notches to secure the conceal band to the wheel in a position covering the annular peripheral wheel rim channel.

16. An annular band as constructed in accordance with claim 15 for concealing a concave annular peripheral wheel rim channel wherein the peripheral wheel rim channel includes a peripheral edge, each clip further including means connected to the body at the longitudinal end of the body seated in the radially outer peripheral edge channel of the band for engaging the peripheral edge of the wheel rim channel, whereby radially outward forces generated by engagement between the cantilever leaf spring section and the cut out notches are counterbalanced.

* * * * *